US006354706B1

(12) United States Patent
Kuttner et al.

(10) Patent No.: US 6,354,706 B1
(45) Date of Patent: Mar. 12, 2002

(54) FREE WHEELING SPROCKET ROTARY GATE FOR MOTION PICTURE FILM

(75) Inventors: David Kuttner; Charles Kouzoujian, both of New York, NY (US)

(73) Assignee: Editing Concepts, Inc., New York, NY (US)

(*) Notice: Subject to any disclaimer, the term of this patent is extended or adjusted under 35 U.S.C. 154(b) by 0 days.

(21) Appl. No.: 09/671,475

(22) Filed: Sep. 27, 2000

Related U.S. Application Data
(60) Provisional application No. 60/157,373, filed on Oct. 1, 1999.

(51) Int. Cl.[7] ............................... G03B 1/00; G03B 1/48
(52) U.S. Cl. ...................... 352/166; 352/221; 352/224; 353/95
(58) Field of Search ................................ 352/166–197, 352/221–231; 353/95, 96; 226/75, 76, 79, 83, 86

(56) References Cited

U.S. PATENT DOCUMENTS 3,937,567 A * 2/1976 Thomas et al. ............... 352/27
3,938,721 A * 2/1976 Staneck et al. ............... 226/75
3,972,606 A * 8/1976 Stewart et al. ............... 352/79

* cited by examiner

Primary Examiner—Russell Adams
Assistant Examiner—Rodney Fuller
(74) Attorney, Agent, or Firm—Levine & Mandelbaum

(57) ABSTRACT

A rotary gate for digitally scanning frames of a motion picture film has a motor drive wheel and a coaxially spaced free wheel which support and engage sprocket holes in the film. The free wheel has no connection to the driven wheel other than the film which rotates the free wheel as it is driven by the drive wheel for advancing the film through the gate. A light source and sensor are provided on opposite sides of the film for illuminating the film and digitally scanning motion picture frames. Sprockets on the drive wheel are profiled to stabilize the film laterally while it is advanced for scanning of each frame. A fixed disc with a smooth track my be substituted for the free wheel for supporting the film.

20 Claims, 3 Drawing Sheets

US 6,354,706 B1

FREE WHEELING SPROCKET ROTARY GATE FOR MOTION PICTURE FILM

This Appln claims benefit of Prov. No. 60/157,373 filed Oct. 1, 1999.

BACKGROUND OF THE INVENTION

This invention relates to transport systems for digital scanning of the frames of a motion picture film. More specifically, the invention is directed to a method of, and the construction of apparatus for transporting film without slack or interference.

Prior art film transports have apparatus between the sprocket wheels which can interfere with even illumination of the film from behind, and with unobstructed sensing of the light transmitted through the film by a CCD.

Slack in the film is also caused when axially displaced sprocket wheels are used due to differences in rotational speed between the sprocket wheels. Pull-down claws, as are used in the prior art, also cause unevenness of movement and bunching of the film.

U.S. Pat. Nos. 5,088,813 and 5,548,328 to Wakefield disclose a scanner in which film is transported over two axially aligned spaced wheels and in which the film is illuminated from behind and the light transmitted through the film is focused by a lens onto a CCD. However, Wakefield's wheels are not able to have the film transmit torque from a driven wheel to a free wheel. Instead, Wakefield uses two respective friction belts which engage respective surfaces of the two wheels, both belts being driven by a common shaft. The belts and shaft can be obstacles to optimum placement of the film illumination source and scanning sensor. Also, slippage between the belts and shaft can result in the application of a net torque which can deform the film and prevent attainment of proper positioning for distortion-free scans.

SUMMARY OF THE INVENTION

The aforementioned problems of the prior art are overcome by the present invention which provides a transport system for high speed digital scanning of the frames of a motion picture film, referred to as a "rotary gate". In a rotary gate for film scanning, according to the invention, two axially aligned film sprocket wheels are spaced apart in parallel planes with no connection between them. The bottom sprocket wheel is rotatably driven by a motor and engages the bottom row of sprocket holes of the film for transporting the film from a supply reel to a take-up reel. The top sprocket, which is free-wheeling, engages the top row of sprocket holes in the film and is rotatably driven by the film while keeping the film taut for scanning of the individual frames.

Because there is no apparatus between the sprocket wheels, it is possible to illuminate the film from behind and sense the light transmitted through the film with a CCD, with none of the slack caused by axially displaced sprocket wheels, and with no interference from intermediate transport mechanisms such as a pull-down claw. Since the film is always maintained taut on the sprockets, registration of the film can be assured.

In an alternate embodiment of the invention, the film is suspended between a driven sprocket wheel and a stationary disc having a smooth track over which the upper margin of the film can glide as it is advanced by the driven wheel.

In order to stabilize the film in the direction of advancement, as well as laterally, the sprockets are provided with a cross sectional profile which facilitates their entry into the film perforations and enables them to tension the film to prevent unwanted movement of the film during each scan of a frame.

DESCRIPTION OF THE PREFERRED EMBODIMENT

Figure 1:
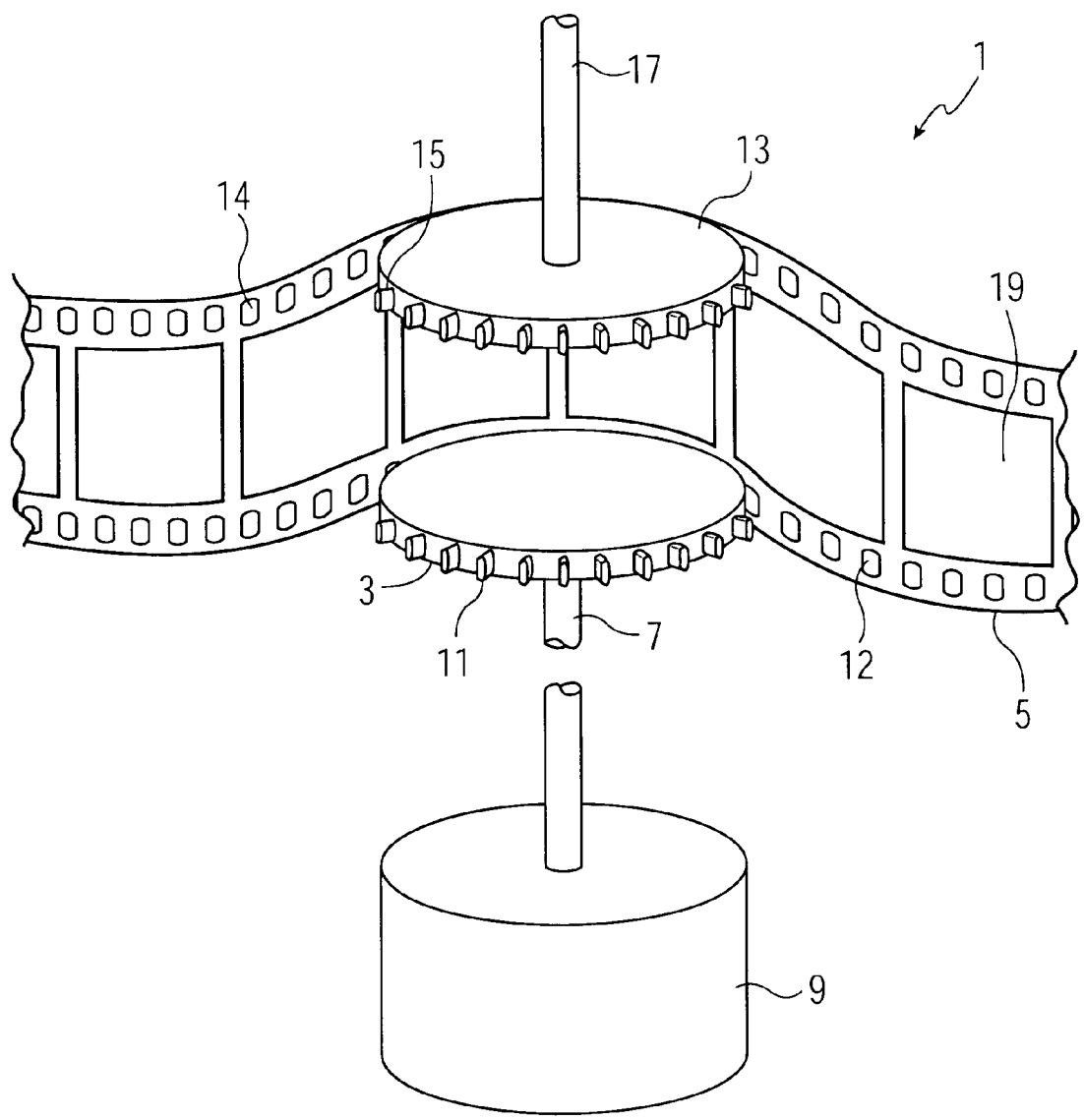
FIG. 1 is a front perspective view of a portion of the preferred embodiment of the invention.

Referring now to FIG. 1 of the drawings, a free wheeling sprocket rotary gate 1 for motion picture film has a drive wheel 3 of the type used for transporting film 5 mounted on a shaft 7 rotatably driven by a motor 9. Sprockets 11 on the wheel 3 engage corresponding sprocket holes or perforations 12 in a margin running along a bottom edge of a segment of a continuous web of film 5. The film 5 is wound on a supply reel, and transported to a take-up reel. The supply reel, or the spindle (not shown) on which it is mounted, is preferably fitted with a friction mechanism, or other drag inducing device, to prevent coasting of the supply reel so that the film 5 is maintained under tension as it is advanced from the supply reel to the take-up reel.

Suspended from above, and in coaxial spaced relationship to the sprocket wheel 3 is a free wheel 13. Sprockets 15 on the free wheel 13 engage corresponding sprocket holes or perforations 14 in a margin running along a top edge of a segment of the continuous web of film 5. The wheel 13 is mounted on a shaft 17 which is journalled in a bearing for rotation in response to the force exerted by the film 5 against the sprockets 15 as the drive wheel 3 advances the film from the supply reel to the take-up reel.

The sprocket wheels 3 and 13 are spaced a distance apart so that the distance between the sprockets 11 and sprockets 15 is equal to the distance between the sprocket holes 12 in the lower margin of the film 5 and sprocket holes 14 in the upper margin of the film 5. The film is tensioned by the sprockets 11 and 15 against bowing thereby ensuring that each frame 19 of film is substantially planar and parallel to the common axis of the sprocket wheels 3 and 13 as the frame passes a viewing position whereat a maximum number of the sprocket holes 12 and 14 are respectively engaged by the sprockets 11 and 15.

Figure 2:
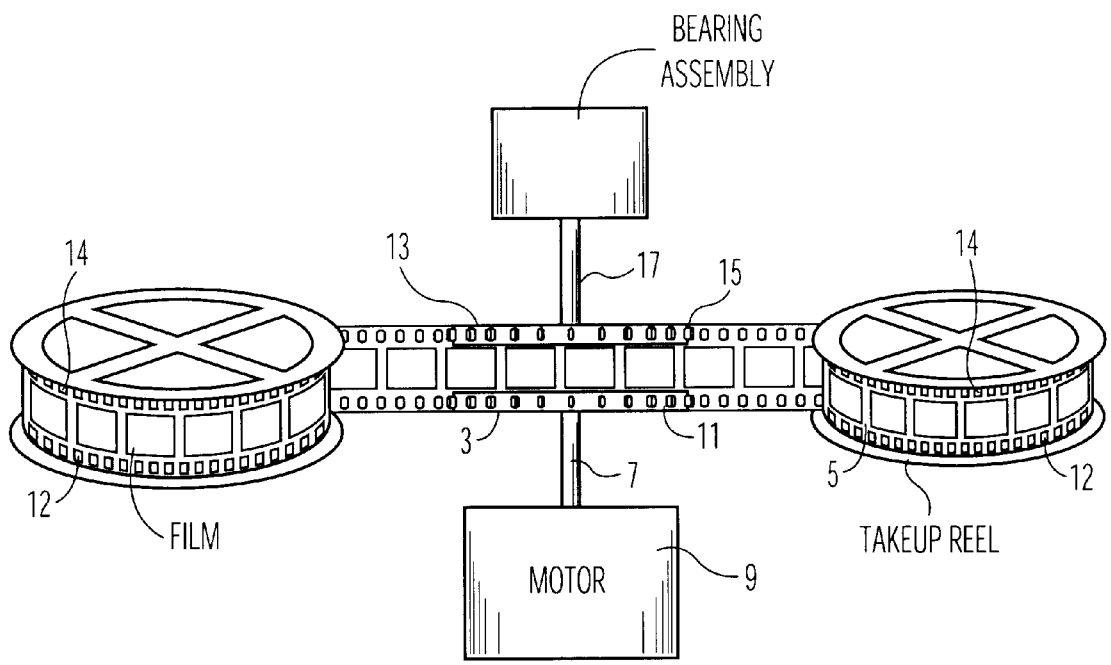
FIG. 2 is a front elevation view of the preferred embodiment of the invention of the invention in its intended environment.

Referring now to FIG. 2 of the drawings, a light source 21, e.g., a projection lamp is mounted for directing a beam of light at a sensor in the form of a digital camera 24 having a charged coupled display (CCD) chip 25. The lamp 21 and camera 24 are mounted so that the center of the beam of light passes through the common axes of the sprocket wheels 3 and 13 at an elevation equal to that of each film frame 19 when in the viewing position. That is, the light source 21 is mounted for projecting light along an axis in a plane intermediate the parallel spaced planes in which the drive wheel 3 and free wheel 13 are rotatable for illuminating the film 5. The CCD 25 is mounted so that its center receives the central ray of light from the lamp 21, the sensing surface of the CCD 25 being parallel to the frame 19 when the latter is in the scanning position.

As each frame enters the viewing position, the CCD 25 is scanned or read for digitizing the image on the frame as will be known to those skilled in the art.

The sprockets 11 and 15 must have a cross sectional profile which is smaller than, and which can be contained within, the profile of the film perforations 12, 14 so as to facilitate entry of each sprocket into a corresponding film perforation as the film is advanced.

A smaller profile for the sprocket relative to the perforation leaves a clearance with can enable free play between the film and sprocket resulting in shifting of the film in its plane and misalignment of a film frame with the light source 21 and camera 24. The sprockets 11,15 of the invention have been designed to have a profile which prevents such shifting and resulting frame instability and misalignment during scanning.

A standard 35 mm film frame has the profile of a circle, 0.11 inches in diameter, truncated by diametrically opposed parallel straight edges spaced 0.073 inches apart. The length of each parallel side is 0.082 inches. For use with 35 mm motion picture film, each sprocket 11, 15 has a cross section with a frontal flat side 41 having a length equal to the length of the flat side 41 of the film perforation 12,14, i.e., 0.082 inches. Opposite side curved surfaces 42,43 of each sprocket extend from the flat side 41, tapering outwardly in conformity with the corresponding edges of the film perforation until maximum separation between the surfaces 42 and 43 is reached at a distance slightly less than one half the distance between the straight sides of the perforation. The side surfaces 42,43 have a radius of curvature equal to the radius of curvature of the perforation proximate the front straight surface 41 and bow inwardly where they intersect with a rear side 44 of the sprocket.

Figure 6:
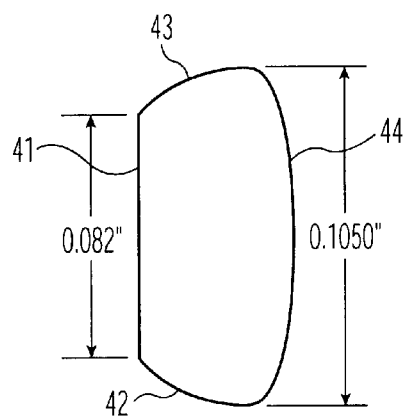
FIG. 6 is an enlarged end view of one of the sprockets shown in FIGS. 1–4.

The rear, optionally curved, surface 44 of each sprocket 11,15 extends from the regions of maximum separation of the side curved surfaces 42,43. In the preferred embodiment of the invention, as applied to 35 mm film, the maximum width of the sprocket cross section, i.e., the distance between the side curved surfaces 42,43 is 0.1050 inches as shown in FIG. 6.

Figure 7:
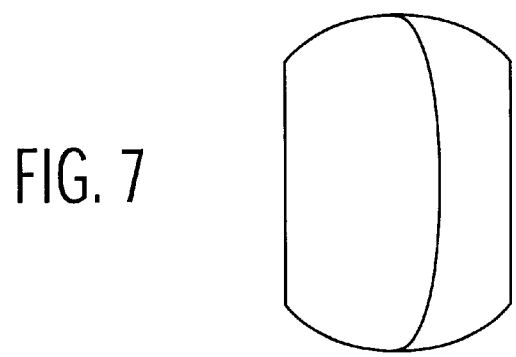
FIG. 7 is an elevation view of the interaction of the film perforation of FIG. 6 with the sprocket of FIG. 7.

As can best be seen in FIG. 7, while penetrating a film perforation 12,14, each sprocket 11,15 is constantly urged against the front and side edges of the perforation which is has penetrated. Each penetrated perforation therefore is held centered with respect to its sprocket. The rear side of the sprocket does not engage with the film, hence, the distance from the front flat surface of the sprocket to the rear surface is not critical. The front of each sprocket should, however, be the same size as the front of the perforation. The diameter of curvature of the side walls of each sprocket, adjacent the front wall 41 preferably should match the diameter of the perforation.

In the event of film shrinkage, even if the width of the front side 41 of the sprocket prevents it from meeting the front of the perforation, the sprocket will still be centered in the perforation by the symmetric curved sides 42,43. To this end, ample space is provided between the rear surface 44 of the sprocket and the rear edge of the perforation to allow for shrinkage of the film base. Upon shrinkage the front wall 41 of the sprocket may not engage the corresponding front edge of the perforation. However, due to symmetry, the side walls 42, 43 of the sprocket will snugly engage the corresponding side edges of the sprocket where they taper outwardly, with the front edge 41 of the sprocket in parallel spaced relationship to the front edge of the sprocket. The net force exerted by the sprocket against the film will be in the forward direction with no freedom for lateral shifting of the film, i.e., in a direction transverse to the forward direction.

Figure 3:
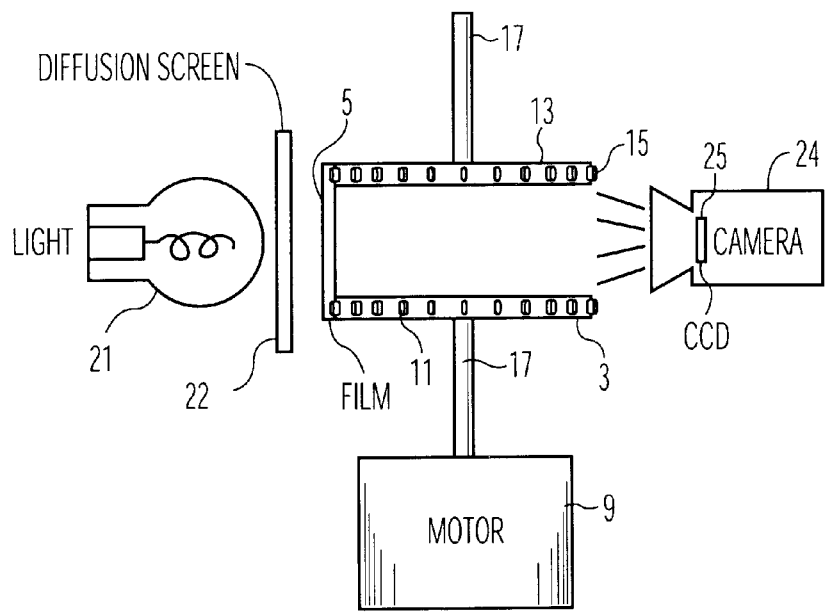
FIG. 3 is a side elevation view of the preferred embodiment of the invention of the invention in its intended environment.
Figure 4:
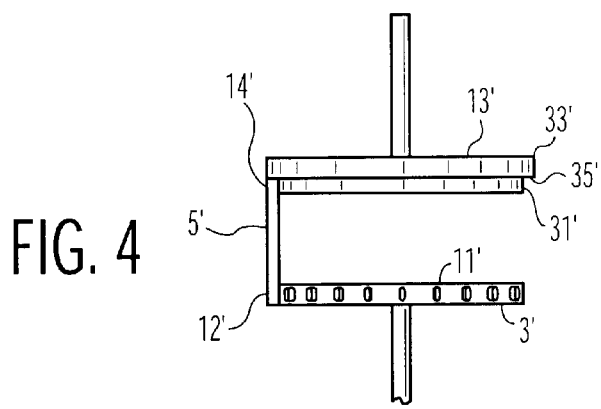
FIG. 4 is a side elevation partial view of an alternate preferred embodiment of the invention.
Figure 5:
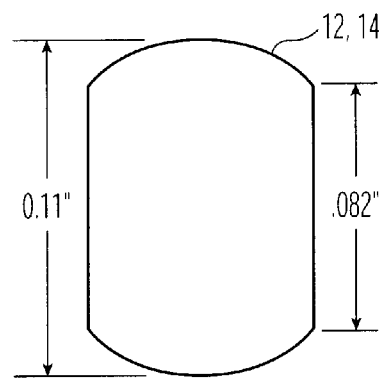
FIG. 5 is an enlarged elevation view of one of the film perforations shown in FIGS. 1–3.

Referring now to FIG. 4 of the drawings, there is shown an alternate arrangement for a rotary gate in which a wheel 3' is driven by a motor in similar arrangement to that shown in FIGS. 1–3. However, unlike the rotary gate of FIGS. 1–3, the rotary gate of FIG. 4 employs a fixed disc 13' which has a stepped diameter forming an inner cylinder 31' and an axially displaced outer cylinder 33'. Although the disc 13' can be rotatably mounted similarly to the sprocket wheel 13 of FIGS. 1–3 and optionally rotated upon engagement of its track by frictional contact with the film, it is preferably fixed relative to the housing of the motor 9 for simplicity, reduced cost, and critical accuracy in positioning the film.

The circumference of the inner and smaller diameter cylinder 31' is smooth and serves as a track over which the upper margin of the film 5', with sprocket holes 14', glides as the film 5' is advanced by rotary action of the motor-driven sprocket wheel 3' with sprockets 11' engaging sprocket holes 12' in the film's lower margin.

The diameter of the outer and larger diameter cylinder 33' is greater than the diameter of the inner and smaller diameter cylinder 31' so that it forms a circular shoulder or lip which extends, radially, beyond the circumference of the track 31' and has a bottom surface 35' which acts as a stop for preventing movement of the film 5 in a lateral direction, i.e., transverse to the direction along which the film is intended to be advanced.

It is to be appreciated that the foregoing is a description of a preferred embodiment of the invention to which variations and modifications may be made without departing from the spirit and scope of the invention.

What is claimed is:

1. A rotary gate for motion picture film comprising,
a motor,
a drive wheel operatively connected to said motor and adapted to be engaged by said film for advancing said film in response to movement of said drive wheel,
a free wheel spaced from and coaxial with said drive wheel and adapted to be engaged by said film, said free wheel being movable in response to said film advancing, there being no operative connection between said drive wheel and said free wheel other than through said film.

2. A rotary gate for motion picture film according to claim 1 further comprising a bearing, said free wheel being mounted on a shaft journalled in said bearing.

3. A rotary gate for motion picture film according to claim 1 wherein said drive wheel comprises sprockets for engaging sprocket holes in said film.

4. A rotary gate in accordance with claim 3 wherein each one of a plurality of said sprockets has a cross section with a straight front edge, two opposite symmetrically curved side edges each of which intersects a different terminus of said front edge, and a rear edge which intersects each of said side edges.

5. A rotary gate in accordance with claim 4 wherein said front edge is equal in width to the front edge of one of said film sprocket holes.

6. A rotary gate in accordance with claim 5 wherein said side edges have a radius of curvature substantially equal to the radius of curvature of a 35 mm film sprocket hole.

7. A rotary gate in accordance with claim 6 wherein said front edge is 0.082 inches in width.

8. A rotary gate in accordance with claim 7 wherein the maximum separation of said side walls is equal to 0.105 inches.

9. A rotary gate for motion picture film according to claim 1 wherein said drive wheel and said free wheel are mounted for rotation about a common axis.

10. A rotary gate for motion picture film according to claim 9 wherein said drive wheel and said free wheel are rotatable in respective parallel spaced planes.

11. A rotary gate for motion picture film according to claim 10 further comprising a light source mounted for projecting light along an axis in a plane intermediate said respective parallel spaced planes for illuminating said film.

12. A rotary gate for motion picture film according to claim 11 further comprising a sensor mounted for receiving light projected from said light source through said film along said axis in a plane intermediate said respective parallel spaced planes, in order to detect an image recorded on said film.

13. A rotary gate for motion picture film according to claim 1 wherein said free wheel comprises sprockets for engaging sprocket holes in said film.

14. A rotary gate for motion picture film comprising, a motor, a drive wheel operatively connected to said motor and adapted to be engaged by a first margin of said film for advancing said film in response to movement of said drive wheel, support means spaced from said drive wheel and having a circular circumference coaxial with said drive wheel and forming a track comprising a smooth surface slidably engageable by an opposite margin of said film while said film is advancing in response to movement of said drive wheel, said support means further having a lip with a surface transverse to said track surface for limiting movement of said film in a direction transverse to the direction of advancement.

15. A rotary gate for motion picture film according to claim 14 wherein said support means has an inner step with an edge comprising said track and an offset outer step comprising said lip, said lip having a surface transverse to and extending outward of said inner step circumference.

16. A rotary gate for motion picture film according to claim 15 wherein said support means comprises a stepped disc with an inner cylinder and an axially displaced outer cylinder, a circumference of said inner cylinder comprising said track and a circumference of said outer cylinder comprising said lip.

17. A rotary gate for motion picture film according to claim 16 wherein said disc is fixedly mounted relative to said motor whereby said opposite film margin is glidable over said track.

18. A rotary gate for motion picture film according to claim 16 wherein said disc is rotatably mounted relative to said motor and freely rotatable whereby said disc may be rotated upon engagement of said track by said advancing opposite film margin.

19. A rotary gate for motion picture film according to claim 14 wherein said drive wheel and support means are in respective parallel spaced planes and further comprising a light source mounted for projecting light along an axis in a plane intermediate said respective parallel spaced planes for illuminating said film.

20. A rotary gate for motion picture film according to claim 19 further comprising a sensor mounted for receiving light projected from said light source through said film along said axis in a plane intermediate said respective parallel spaced planes, in order to detect an image recorded on said film.

* * * * *